US012452250B2

(12) United States Patent
Michel

(10) Patent No.: US 12,452,250 B2
(45) Date of Patent: Oct. 21, 2025

(54) PROVIDING A WORKER EAR WITH ACCESS TO A COORDINATING EAR

(71) Applicant: Dell Products L.P., Round Rock, TX (US)

(72) Inventor: Ruben I. Michel, Hopkinton, MA (US)

(73) Assignee: Dell Products L.P., Round Rock, TX (US)

( * ) Notice: Subject to any disclaimer, the term of this patent is extended or adjusted under 35 U.S.C. 154(b) by 365 days.

(21) Appl. No.: 18/105,366

(22) Filed: Feb. 3, 2023

(65) Prior Publication Data
US 2024/0267386 A1 Aug. 8, 2024

(51) Int. Cl.
H04L 9/40 (2022.01)
G06F 16/11 (2019.01)

(52) U.S. Cl.
CPC ........ *H04L 63/105* (2013.01); *H04L 63/0209* (2013.01); *G06F 16/113* (2019.01)

(58) Field of Classification Search
CPC ... H04L 63/105; H04L 63/0209; G06F 16/113
See application file for complete search history.

(56) References Cited

U.S. PATENT DOCUMENTS

| 10,922,189 | B2* | 2/2021 | Swallow | G06F 11/302 |
| 2005/0010619 | A1* | 1/2005 | Kassai | G06F 16/219 |
| 2017/0351591 | A1* | 12/2017 | Crawford | G06F 11/3034 |
| 2018/0359317 | A1* | 12/2018 | Muthiah | H04L 69/40 |
| 2020/0110675 | A1* | 4/2020 | Wang | G06F 11/2028 |
| 2022/0368613 | A1* | 11/2022 | Darji | G06F 9/5005 |

* cited by examiner

Primary Examiner — James R Turchen
(74) Attorney, Agent, or Firm — Krishnendu Gupta; Nikhil Patel

(57) ABSTRACT

One or more aspects of the present disclosure relate to providing a worker archive with access to a coordinating archive. In embodiments, a worker archive is provided access to one or more components in a main coordinating archive. In addition, an incoming protocol communication is processed using a subject component from the main coordinating archive using the worker archive.

16 Claims, 4 Drawing Sheets

PROVIDING A WORKER EAR WITH ACCESS TO A COORDINATING EAR

BACKGROUND

A storage array performs block-based, file-based, or object-based storage services. Rather than store data on a server, storage arrays can include multiple storage devices (e.g., drives) to store vast amounts of data. For example, a financial institution can use storage arrays to collect and store financial transactions from local banks and automated teller machines (ATMs) related to, e.g., bank account deposits/withdrawals. In addition, storage arrays can include a central management system (CMS) that manages the data and delivers one or more distributed storage services for an organization. The central management system can include one or more processors that perform data storage services.

SUMMARY

One or more aspects of the present disclosure relate to providing a worker archive with access to a coordinating archive. In embodiments, a worker archive is provided constrained access to a subject component of a plurality of components corresponding to a main coordinating archive. In addition, an incoming protocol communication is processed using the worker archive.

In embodiments, archives can be sequentially deployed. Additionally, a last archive in the archives sequence can be established as the main coordinating archive. Further, one or more archives deployed before the main coordinating archive in the sequence of archives can be established as worker archives.

In embodiments, an access hierarchy corresponding to the sequentially deployed archives can be established to define each archive's ability to access other archives in the archive sequence. For example, the access hierarchy can be established to allow each archive to access one or more archives deployed earlier in the archives sequence.

In embodiments, a globally accessing naming and directory interface (NDI) can be established. Additionally, a subject component of the main coordinating archive's one or more components the worker archive can utilize to perform a task can be identified. Further, a bean can be added to the main coordinating archive. In addition, a record with information corresponding to the bean can be created in the NDI.

In embodiments, a container request filter (CREQF) can be created in the worker archive. In addition, a container response filter (CRESF) can be created in the worker archive. Further, protocol servlets can be injected into the CREQF and the CRESF. For example, the protocol servlets can include a protocol servlet request and response. In addition, context information corresponding to the task and the subject component can be injected into the CREQF in response to receiving the incoming protocol communication.

In embodiments, the main coordinating archive's bean can be obtained using the NDI. Further, a modified protocol servlet request corresponding to the incoming protocol communication can be created. For example, creating the modified protocol servlet request can include wrapping a protocol servlet request of the incoming protocol communication with a protocol servlet request header of the main coordinating archive.

In embodiments, the subject component of the main coordinating archive can be invoked using the obtained bean via the CREQF to preprocess the incoming protocol communication. For example, processing the incoming protocol can include passing the modified protocol servlet request, the protocol servlet response, a remote address, and other metadata corresponding to the incoming protocol communication to the main coordinating archive's bean.

In embodiments, after the CREQF successfully preprocesses the incoming protocol communication, the incoming protocol communication can be processed by the worker archive.

In embodiments, the subject component can be invoked to perform the cleanup service using the obtained bean via the CRESF.

In embodiments, the firewalls can be bypassed using a reflection service via the CREQF or CRESF.

Other technical features may be readily apparent to one skilled in the art from the following figures, descriptions, and claims.

BRIEF DESCRIPTION OF THE DRAWINGS

The preceding and other objects, features, and advantages will be apparent from the following more particular description of the embodiments, as illustrated in the accompanying drawings. Like reference, characters refer to the same parts throughout the different views. The drawings are not necessarily to scale, emphasis instead being placed upon illustrating the embodiments' principles.

DETAILED DESCRIPTION

Figure 1:
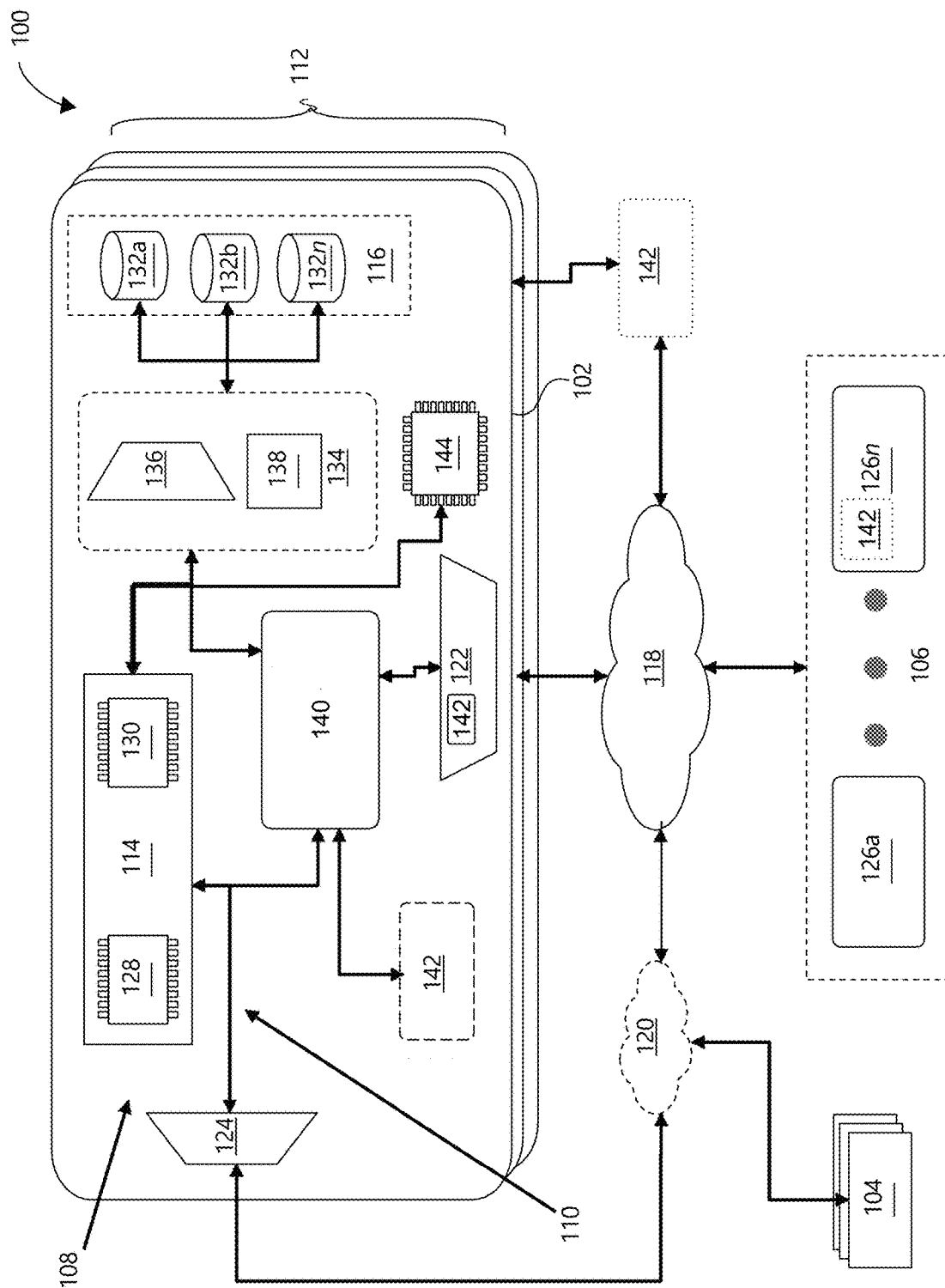
FIG. 1 illustrates a distributed network environment in accordance with embodiments of the present disclosure.

Regarding FIG. 1, a distributed network environment 100 can include a storage array 102, a remote system 104, and hosts 106. In embodiments, the storage array 102 can include components 108 that perform one or more distributed file storage services. In addition, the storage array 102 can include one or more internal communication channels 110 like Fibre channels, busses, and communication modules that communicatively couple the components 108. Further, the distributed network environment 100 can define an array cluster 112 that includes the storage array 102 and one or more other storage arrays.

In embodiments, the storage array 102, components 108, and remote system 104 can include a variety of proprietary or commercially available single or multiprocessor systems (e.g., parallel processor systems). Single or multiprocessor systems can include central processing units (CPUs), graphical processing units (GPUs), and the like. Additionally, the storage array 102, remote system 104, and hosts 106 can virtualize one or more of their respective physical computing resources (e.g., processors (not shown), memory 114, and persistent storage 116).

In embodiments, the storage array 102 and, e.g., one or more hosts 106 (e.g., networked devices) can establish a network 118. Similarly, the storage array 102 and a remote system 104 can establish a remote network 120. Further, the network 118 or the remote network 120 can have a network architecture that enables networked devices to send/receive electronic communications using a communications protocol. For example, the network architecture can define a storage area network (SAN), local area network (LAN), wide area network (WAN) (e.g., the Internet), an Explicit Congestion Notification (ECN), Enabled Ethernet network, and the like. Additionally, the communications protocol can include a Remote Direct Memory Access (RDMA), TCP, IP, TCP/IP protocol, SCSI, Fibre Channel, Remote Direct Memory Access (RDMA) over Converged Ethernet (ROCE) protocol, Internet Small Computer Systems Interface (iSCSI) protocol, NVMe-over-fabrics protocol (e.g., NVMe-over-ROCEv2 and NVMe-over-TCP), and the like.

Further, the storage array 102 can connect to the network 118 or remote network 120 using one or more network interfaces. The network interface can include a wired/wireless connection interface, bus, data link, and the like. For example, a host adapter (HA 122), e.g., a Fibre Channel Adapter (FA) and the like, can connect the storage array 102 to the network 118 (e.g., SAN). Further, the HA 122 can receive and direct IOs to one or more of the storage array's components 108, as described in greater detail herein.

Likewise, a remote adapter (RA 124) can connect the storage array 102 to the remote network 120. Further, the network 118 and remote network 120 can include communication mediums and nodes that link the networked devices. For example, communication mediums can include cables, telephone lines, radio waves, satellites, infrared light beams, etc. Additionally, the communication nodes can include switching equipment, phone lines, repeaters, multiplexers, and satellites. Further, the network 118 or remote network 120 can include a network bridge that enables cross-network communications between, e.g., the network 118 and remote network 120.

In embodiments, hosts 106 connected to the network 118 can include client machines 126a-n, running one or more applications. The applications can require one or more of the storage array's services. Accordingly, each application can send one or more input/output (IO) messages (e.g., a read/write request or other storage service-related request) to the storage array 102 over the network 118. Further, the IO messages can include metadata defining performance requirements according to a service level agreement (SLA) between hosts 106 and the storage array provider.

In embodiments, the storage array 102 can include a memory 114, such as volatile or nonvolatile memory. Further, volatile and nonvolatile memory can include random access memory (RAM), dynamic RAM (DRAM), static RAM (SRAM), and the like. Moreover, each memory type can have distinct performance characteristics (e.g., speed corresponding to reading/writing data). For instance, the types of memory can include register, shared, constant, user-defined, and the like. Furthermore, in embodiments, the memory 114 can include global memory (GM 128) that can cache IO messages and their respective data payloads. Additionally, the memory 114 can include local memory (LM 130) that stores instructions that the storage array's processors 144 can execute to perform one or more storage-related services. For example, the storage array 102 can have a multiprocessor architecture that includes one or more CPUs (central processing units) and GPUs (graphical processing units).

In addition, the storage array 102 can deliver its distributed storage services using persistent storage 116. For example, the persistent storage 116 can include multiple thin-data devices (TDATs) such as persistent storage drives 132a-n. Further, each TDAT can have distinct performance capabilities (e.g., read/write speeds) like hard disk drives (HDDs) and solid-state drives (SSDs).

Further, the HA 122 can direct one or more IOs to an array component 108 based on their respective request types and metadata. In embodiments, the storage array 102 can include a device interface (DI 134) that manages access to the array's persistent storage 116. For example, the DI 134 can include a disk adapter (DA 136) (e.g., storage device controller), flash drive interface 138, and the like that controls access to the array's persistent storage 116 (e.g., storage devices 132a-n).

Likewise, the storage array 102 can include an Enginuity Data Services processor (EDS 140) that can manage access to the array's memory 114. Further, the EDS 140 can perform one or more memory and storage self-optimizing operations (e.g., one or more machine learning techniques) that enable fast data access. Specifically, the operations can implement techniques that deliver performance, resource availability, data integrity services, and the like based on the SLA and the performance characteristics (e.g., read/write times) of the array's memory 114 and persistent storage 116. For example, the EDS 140 can deliver hosts 106 (e.g., client machines 126a-n) remote/distributed storage services by virtualizing the storage array's memory/storage resources (memory 114 and persistent storage 116, respectively).

In embodiments, the storage array 102 can also include a controller 142 (e.g., management system controller) that can reside externally from or within the storage array 102 and one or more of its components 108. When external from the storage array 102, the controller 142 can communicate with the storage array 102 using any known communication connections. For example, the communications connections can include a serial port, parallel port, network interface card (e.g., Ethernet), etc. Further, the controller 142 can include logic/circuitry that performs one or more storage-related services. For example, the controller 142 can have an architecture designed to manage the storage array's computing, processing, storage, and memory resources as described in greater detail herein.

In embodiments, a client machine (e.g., client machine 126n) can include the controller 142. When included in a client machine, the controller 142 can include logic and circuitry configured to perform network communication services over, e.g., the network 118. For example, the controller 142 can disable executable instructions from a network message sent to the storage array 102.

Figure 2:
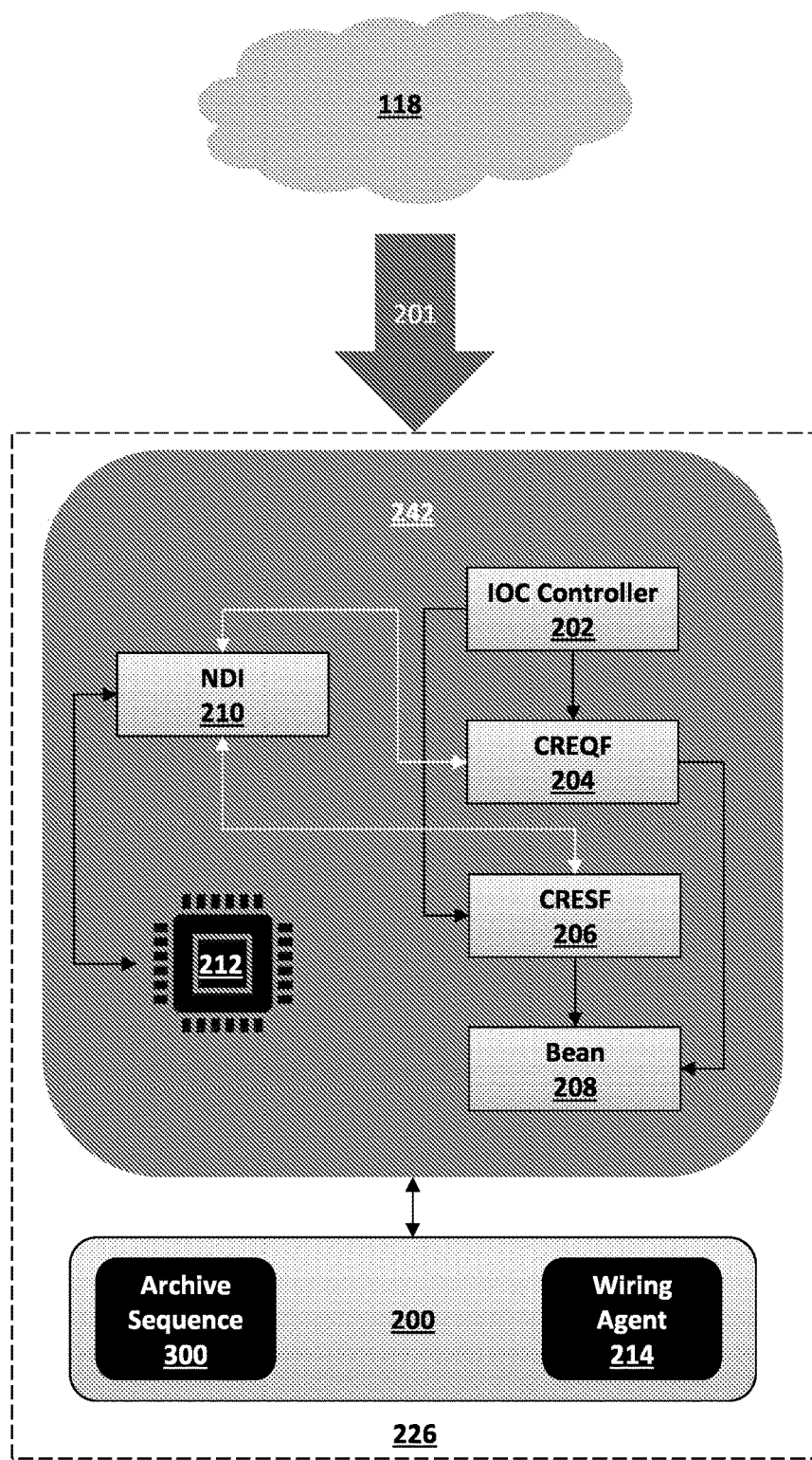
FIG. 2 is a block diagram of a controller in accordance with embodiments of the present disclosure.

Regarding FIG. 2, a storage area network (SAN) 118 can include a host, e.g., client machine 226, which is substantially similar to client machines 126a-n. In addition, the client machine 226 can include a network controller 242 (e.g., controller 142 of FIG. 1) and host a server 200 that process network messages received from the SAN 118. Specifically, the network messages can include a Hypertext Transfer Protocol Secure (HTTPS) message 201.

In addition, the server 200 can include a wiring agent 214 that delivers wiring services to the network controller 242. Further, the server 200 can host an archive sequence 300. For example, the archive sequence 300 can include archives, e.g., Enterprise Archives (EARs) sequentially deployed to the server 200. The archives include a main coordinating archive and several worker archives (e.g., the main coordinating archive 302 and the worker archives 304a-n of FIG. 3). Further, an archive hierarchy can define accessibility rules for each archive in the archive sequence 300, as described in greater detail below.

In embodiments, the HTTPS message 201 can include a destination address matching, e.g., a representational state transfer (REST) endpoint corresponding to a subject worker archive (e.g., worker archive 304a of FIG. 3) of the several archives. Further, the subject worker archive can require access to a subject service component of the main coordinating archive's one or more components (e.g., the components 306 of FIG. 3) to process the HTTPS message 201. As described in greater detail below, the subject worker archive can obtain constrained access to the subject service component to process the HTTPS message 201 using a bean 208.

In embodiments, the network controller 242 can include an inversion-of-control (IOC) framework controller 202 provides injection services for the archive sequence 300. For example, the IOC controller 202 can include logic and circuitry defining a Contexts and Dependency Injection (CDI) subsystem and the like. Further, the IOC controller 202 or the wiring agent 214 can create a container request filter (CREQF) 204 and a container response filter (CRESF) 206 in the subject worker archive. For example, the IOC controller 202 or the wiring agent 214 can inject the CREQF 204 and CRESF 206 into the subject worker archive.

In response to receiving the HTTPS message 201, the IOC controller 202 can inject request and response protocol servlets from the HTTPS message 201 into the CREQF 204 and CRESF 206. Additionally, the IOC controller 202 can inject metadata from the HTTPS message 201 into the CREQF 204. For example, the metadata data can include context data such as user information, information corresponding to the subject service component, and the like.

In embodiments, the CREQF 204 can intercept and preprocess the HTTPS message 201 before it reaches the subject worker archive's REST endpoint. For example, the CREQF 204 can identify the subject service component from the main coordinative archive's plurality of service components the subject worker archive requires to process the HTTPS message 201. Upon identifying the subject service component, the CREQF 204 can search for a bean of a plurality of beans that corresponds to the subject service component. For example, each bean can include functionality the subject worker archive can access to enhance its capabilities. Specifically, a bean 208 can include functionality the subject worker archive requires to process the HTTPS message 201.

In embodiments, the network controller 202 can include a naming and device interface (NDI) 210 that maintains a searchable data structure in a local memory 212, mapping each of the plurality beans and their corresponding functionality to one or more components of, e.g., the archive sequence's corresponding main coordinating archive or worker archives. For example, the NDI 210 can include a record that maps the bean 208 to, e.g., a service component corresponding to the main coordinating archive. Thus, the CREQF 204 can query the NDI 210 to determine that the subject worker archive can obtain constrained access to the subject component corresponding to the main coordinating archive via the bean 208.

In embodiments, the IOC controller 202 can inject the bean 208 into the main coordinative archive. For example, the IOC controller 202 can select the bean 208 from the local memory 212 based on the format of the HTTPS message 201, the message's target endpoint, and the like. Additionally, the IOC controller 202 can inject protocol servlet headers (e.g., request and response headers) corresponding to the main coordinative archive into the CREQF 204 and CRESF 206.

In embodiments, the CREQF 204 can create a modified protocol servlet request corresponding to the HTTPS message 201. For example, the CREQF 204 can wrap the protocol servlet request of the HTTPS message with a protocol request servlet header corresponding to the main coordinative archive. Further, the CREQF 204 can invoke the subject service component by passing the modified protocol servlet request, the HTTPS message's protocol servlet response and destination address, and the like to the bean 208 injected into the main coordinative archive. Additionally, using a reflection technique, the CREQF 204 can bypass one or more firewalls (e.g., the firewalls 320 of FIG. 3) to access the subject service component.

After the CREQF 204 successfully preprocesses the HTTPS message 201, it can be passed to the subject worker archive's REST endpoint, enabling it to process the HTTPS message 201. Once the subject worker archive processes the HTTPS message 21, the CRESF 206 can use the bean 208 to invoke the subject service component to perform a cleanup service. For example, like the CREQF 204, the CRESF 206 can bypass the firewalls to access the subject service component. Additionally, the CRESF 206 can clear injected context data.

Figure 3:
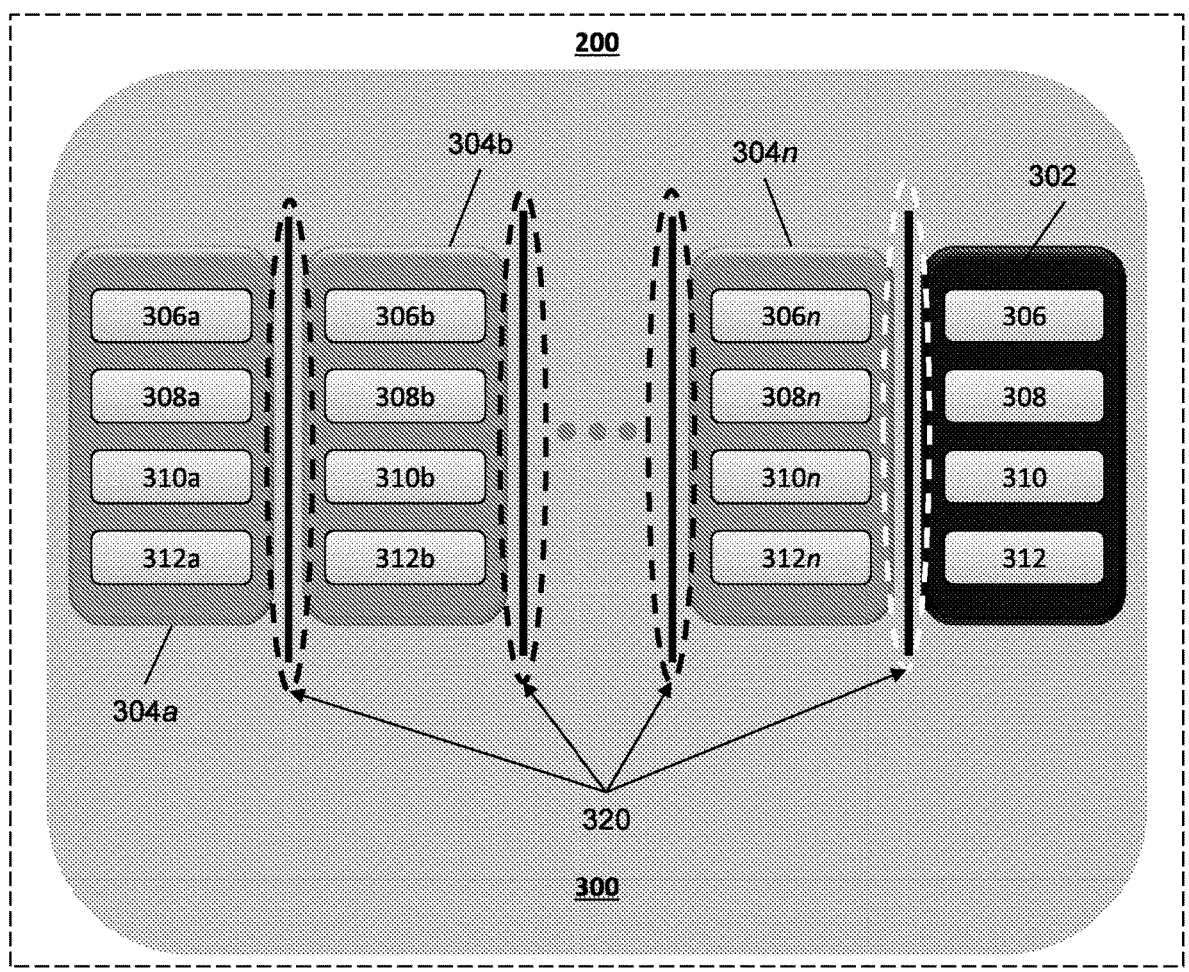
FIG. 3 is a block diagram of an inheritance hierarchy of a class object per embodiments of the present disclosure.

Regarding FIG. 3, archives of an archive sequence 300 can be sequentially deployed on a server 200. The archive sequence 300 can include a main coordinating archive 302 and one or more worker archives 304a-n. For example, the last archive deployed in the archive sequence 300 is established as the main coordinative archive 302. Additionally, the archives deployed before the last archive are established as the worker archives 304a-n. In embodiments, the main coordinating archive 302 can include service components 306, logic 308, access controller 310, and utilities 312. Likewise, the worker archives 304a-n can include corresponding service components 306a-n, logic 308a-n, access controllers 310a-n, and utilities 312a-n.

In embodiments, the access controllers 310, 310a-n can define the accessibility of archives in the archive sequence 300 for their respective archives 302, 304a-n. Specifically, an access hierarchy can define accessibility rules for the archive sequence 300. For example, the access hierarchy can provide each archive access to one or more archives deployed earlier in the archive sequence 300. Additionally, the access controllers 310, 310a-n can establish firewalls 320 to enforce accessibility rules for their corresponding archives 302, 304a-n.

The following text includes details of a method(s) or a flow diagram(s) per embodiments of this disclosure. For simplicity of explanation, each method is depicted and described as a set of alterable operations. Additionally, one or more operations can be performed in parallel, concurrently, or in a different sequence. Further, not all the illustrated operations are required to implement each method described by this disclosure.

Figure 4:
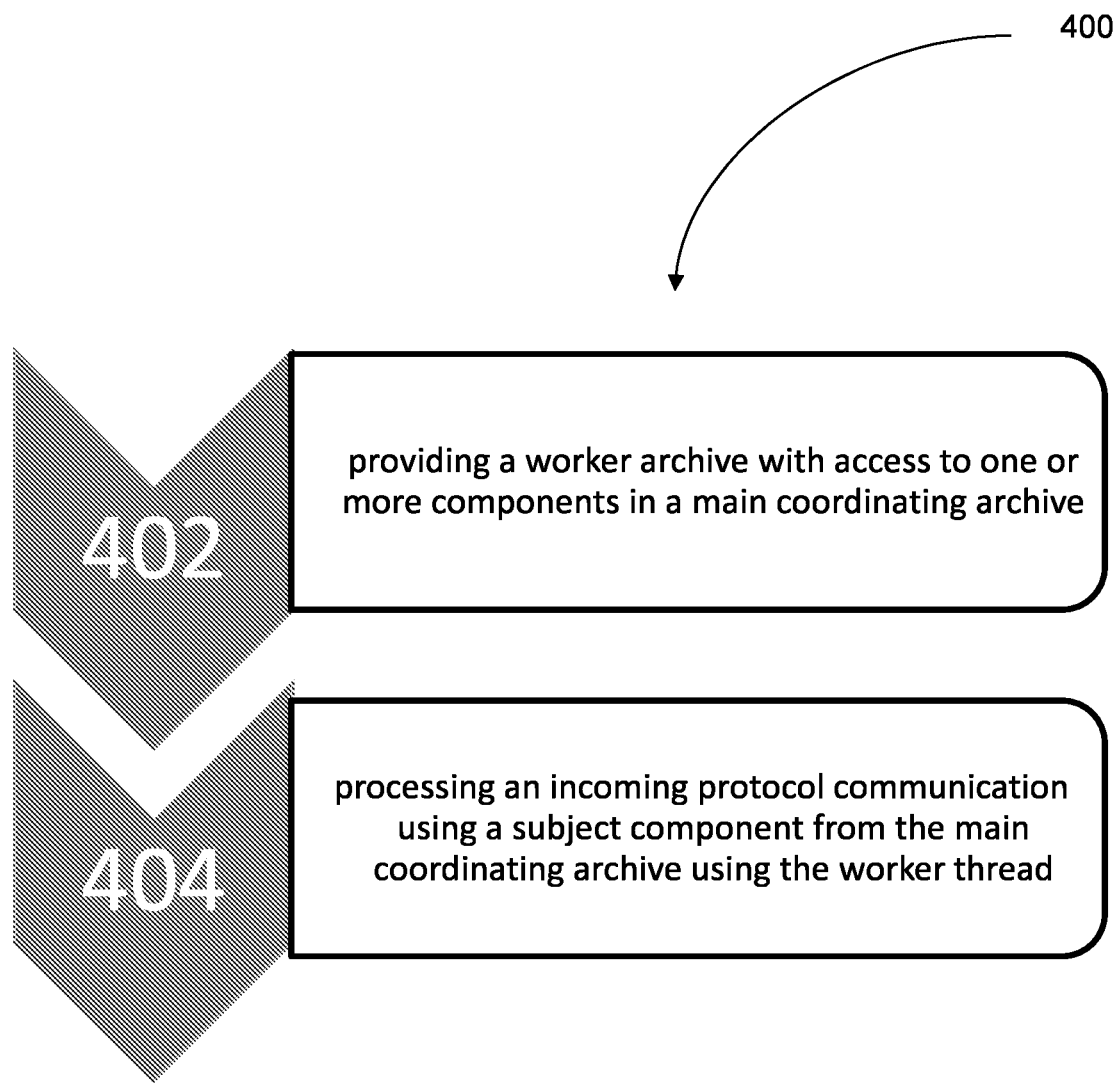
FIG. 4 is a flow diagram of a method for providing a worker archive with access to a coordinating archive per embodiments of the present disclosure.

Regarding FIG. 4, a method 400 relates to controlling access to a coordinating archive. In embodiments, the controller 142 of FIG. 1 can perform all or a subset of operations corresponding to method 400. For example, the method 400, at 402, can include providing a worker archive with access to one or more components in a main coordinating archive. Additionally, at 404, the method 400 can include processing an incoming protocol communication using a subject component from the main coordinating archive using the worker archive.

Further, each operation can include any combination of techniques implemented by the embodiments described herein. Additionally, one or more of the storage array's components 108 can implement one or more of the operations of each method described above.

Using the teachings disclosed herein, a skilled artisan can implement the above-described systems and methods in digital electronic circuitry, computer hardware, firmware, or software. The implementation can be a computer program product. Additionally, the implementation can include a machine-readable storage device for execution by or to control the operation of a data processing apparatus. The implementation can, for example, be a programmable processor, a computer, or multiple computers.

A computer program can be in any programming language, including compiled or interpreted languages. The computer program can have any deployed form, including a stand-alone program, subroutine, element, or other units suitable for a computing environment. One or more computers can execute a deployed computer program.

One or more programmable processors can perform the method steps by executing a computer program to perform the concepts described herein by operating on input data and generating output. An apparatus can also perform the method steps. The apparatus can be a special-purpose logic circuitry. For example, the circuitry is an FPGA (field-programmable gate array) or an ASIC (application-specific integrated circuit). Subroutines and software agents can refer to portions of the computer program, the processor, the special circuitry, software, or hardware that implements that functionality.

Processors suitable for executing a computer program include, by way of example, both general and special purpose microprocessors and any one or more processors of any digital computer. A processor can receive instructions and data from a read-only memory, a random-access memory, or both. Thus, for example, a computer's essential elements are a processor for executing instructions and one or more memory devices for storing instructions and data. Additionally, a computer can receive data from or transfer data to one or more mass storage device(s) for storing data (e.g., magnetic, magneto-optical disks, solid-state drives (SSDs, or optical disks).

Data transmission and instructions can also occur over a communications network. Information carriers that embody computer program instructions and data include all nonvolatile memory forms, including semiconductor memory devices. The information carriers can, for example, be EPROM, EEPROM, flash memory devices, magnetic disks, internal hard disks, removable disks, magneto-optical disks, CD-ROM, or DVD-ROM disks. In addition, the processor and the memory can be supplemented by or incorporated into special-purpose logic circuitry.

A computer having a display device that enables user interaction can implement the above-described techniques, such as a display, keyboard, mouse, or any other input/output peripheral. The display device can, for example, be a cathode ray tube (CRT) or a liquid crystal display (LCD) monitor. The user can provide input to the computer (e.g., interact with a user interface element). In addition, other kinds of devices can enable user interaction. Other devices can, for example, be feedback provided to the user in any form of sensory feedback (e.g., visual feedback, auditory feedback, or tactile feedback). Input from the user can, for example, be in any form, including acoustic, speech, or tactile input.

A distributed computing system with a back-end component can also implement the above-described techniques. The back-end component can, for example, be a data server, a middleware component, or an application server. Further, a distributing computing system with a front-end component can implement the above-described techniques. The front-end component can, for example, be a client computer having a graphical user interface, a Web browser through which a user can interact with an example implementation, or other graphical user interfaces for a transmitting device. Finally, the system's components can interconnect using any form or medium of digital data communication (e.g., a communication network). Examples of communication network(s) include a local area network (LAN), a wide area network (WAN), the Internet, a wired network(s), or a wireless network(s).

The system can include a client(s) and server(s). The client and server (e.g., a remote server) can interact through a communication network. For example, a client-and-server relationship can arise by computer programs running on the respective computers and having a client-server relationship. Further, the system can include a storage array(s) that delivers distributed storage services to the client(s) or server (s).

Packet-based network(s) can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network(s), 802.16 network(s), general packet radio service (GPRS) network, HiperLAN), or other packet-based networks. Circuit-based network(s) can include, for example, a public switched telephone network (PSTN), a private branch exchange (PBX), a wireless network, or other circuit-based networks. Finally, wireless network(s) can include RAN, Bluetooth, code-division multiple access (CDMA) networks, time division multiple access (TDMA) networks, and global systems for mobile communications (GSM) networks.

The transmitting device can include, for example, a computer, a computer with a browser device, a telephone, an IP phone, a mobile device (e.g., cellular phone, personal digital assistant (P.D.A.) device, laptop computer, electronic mail device), or other communication devices. The browser device includes, for example, a computer (e.g., desktop computer, laptop computer) with a world wide web browser (e.g., Microsoft® Internet Explorer® and Mozilla®). The mobile computing device includes, for example, a Blackberry®.

Comprise, include, or plural forms of each are open-ended, include the listed parts, and contain additional unlisted elements. Unless explicitly disclaimed, the term 'or' is open-ended and includes one or more of the listed parts, items, elements, and combinations thereof.

What is claimed is:
1. A method comprising:
providing a worker archive with constrained access to a subject component of a plurality of components corresponding to a main coordinating archive;
sequentially deploying archives;
establishing a last archive in the archives sequence as the main coordinating archive;
establishing one or more archives deployed before the main coordinating archive in the sequence of archives as worker archives;
establishing an access hierarchy for the archives sequence that allows each archive to access one or more archives deployed earlier in the archives sequence;
enforcing the access hierarchy using firewalls; and
processing an incoming protocol communication using the worker archive.
2. The method of claim 1, further comprising:
establishing a globally accessing naming and directory interface (NDI);

identifying a subject component of the main coordinating archive's one or more components the worker archive can utilize to perform a task;

adding a bean into the main coordinating archive; and creating a record with information corresponding to the bean in the NDI.

3. The method of claim 2, further comprising:

creating a container request filter (CREQF) in the worker archive;

injecting request protocol servlets into the CREQF;

creating a container response filter (CRESF) in the worker archive that performs a cleanup service;

injecting response protocol servlets into the CRESF; and injecting context information corresponding to the task and the subject component into the CREQF in response to receiving the incoming protocol communication.

4. The method of claim 3, further comprising:

obtain the main coordinating archive's bean using the NDI; and creating a modified protocol servlet request corresponding to the incoming protocol communication, wherein creating the modified protocol servlet request includes wrapping a protocol servlet request of the incoming protocol communication with a protocol servlet request header of the main coordinating archive.

5. The method of claim 4, further comprising:

invoking the subject component of the main coordinating archive using the obtained bean via the CREQF to preprocess the incoming protocol communication, wherein preprocessing the incoming protocol communication includes passing the modified protocol servlet request, the protocol servlet response, and a remote address and other metadata corresponding to the incoming protocol communication to the main coordinating archive's bean.

6. The method of claim 5, further comprising:

after the CREQF successfully preprocesses the incoming protocol communication, processing the incoming protocol communication using the worker archive.

7. The method of claim 6, further comprising:

invoking the subject component to perform the cleanup service using the obtained bean via the CRESF.

8. The method of claim 7, further comprising:

bypassing the firewalls using a reflection service via the CREQF or CRESF.

9. An apparatus with a memory and processor, the apparatus configured to:

provide a worker archive with constrained access to a subject component of a plurality of components corresponding to a main coordinating archive;

sequentially deploy archives;

establish a last archive in the archives sequence as the main coordinating archive;

establish one or more archives deployed before the main coordinating archive in the sequence of archives as worker archives;

establish an access hierarchy for the archives sequence that allows each archive to access one or more archives deployed earlier in the archives sequence;

enforce the access hierarchy using firewalls; and process an incoming protocol communication using the worker archive.

10. The apparatus of claim 9, further configured to:

establish a globally accessing naming and directory interface (NDI);

identify a subject component of the main coordinating archive's one or more components the worker archive can utilize to perform a task;

add a bean into the main coordinating archive; and create a record with information corresponding to the bean in the NDI.

11. The apparatus of claim 10, further configured to:

create a container request filter (CREQF) in the worker archive;

inject request protocol servlets into the CREQF;

create a container response filter (CRESF) in the worker archive that performs a cleanup service;

inject response protocol servlets into the CRESF; and inject context information corresponding to the task and the subject component into the CREQF in response to receiving the incoming protocol communication.

12. The apparatus of claim 11, further configured to:

obtain the main coordinating archive's bean using the NDI; and create a modified protocol servlet request corresponding to the incoming protocol communication, wherein creating the modified protocol servlet request includes wrapping a protocol servlet request of the incoming protocol communication with a protocol servlet request header of the main coordinating archive.

13. The apparatus of claim 12, further configured to:

invoke the subject component of the main coordinating archive using the obtained bean via the CREQF to preprocess the incoming protocol communication, wherein preprocessing the incoming protocol communication includes passing the modified protocol servlet request, the protocol servlet response, and a remote address and other metadata corresponding to the incoming protocol communication to the main coordinating archive's bean.

14. The apparatus of claim 13, further configured to:

after the CREQF successfully preprocesses the incoming protocol communication, process the incoming protocol communication using the worker archive.

15. The apparatus of claim 14, further configured to:

invoke the subject component to perform the cleanup service using the obtained bean via the CRESF.

16. The apparatus of claim 15, further configured to:

bypass the firewalls using a reflection service via the CREQF or CRESF.

* * * * *